United States Patent
Baratham et al.

(10) Patent No.: US 12,061,944 B1
(45) Date of Patent: Aug. 13, 2024

(54) DE-DUPLICATING REDUNDANT DATA FOR DATA AGGREGATION

(71) Applicant: Amazon Technologies, Inc., Seattle, WA (US)

(72) Inventors: Arjuna Baratham, Laguna Hills, CA (US); Jim Lizzi, San Clemente, CA (US); Nazia Asif Chorwadwala, Trabuco Canyon, CA (US); Shankar Manjunatha, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/845,089

(22) Filed: Jun. 21, 2022

(51) Int. Cl.
*G06K 19/07* (2006.01)
*G06F 16/215* (2019.01)
*G06F 16/2455* (2019.01)
*G06K 7/00* (2006.01)

(52) U.S. Cl.
CPC ....... *G06K 19/0723* (2013.01); *G06F 16/215* (2019.01); *G06F 16/24568* (2019.01); *G06K 7/0008* (2013.01)

(58) Field of Classification Search
CPC .............. G06K 19/0723; G06K 7/0008; G06F 16/24568; G06F 16/215
See application file for complete search history.

(56) References Cited

U.S. PATENT DOCUMENTS

| | | | | |
|---|---|---|---|---|
| 9,672,396 | B1* | 6/2017 | Bookman | G06K 7/10415 |
| 2008/0155090 | A1* | 6/2008 | Ruscin | G06Q 50/30 |
| | | | | 709/224 |
| 2009/0085723 | A1* | 4/2009 | Traub | H04Q 9/00 |
| | | | | 340/10.3 |
| 2013/0110794 | A1* | 5/2013 | Lee | G06F 16/215 |
| | | | | 707/E17.002 |

* cited by examiner

*Primary Examiner* — Omer S Khan
(74) *Attorney, Agent, or Firm* — Kilpatrick Townsend & Stockton LLP

(57) ABSTRACT

De-duplicating redundant data for data aggregation is described herein. In an example, a computing device receives first data identifying first items. The computing device determines that a first data portion and a second data portion indicate that a same item is detected to be within a location. The computing device generates second data by removing the second data portion from the first data. The computing device determines, based on a query to a data store storing previously stored data identifying second items, that (i) a no match exists between the first data portion and the previously stored data, (ii) a match exists between a third data portion of the second data and the previously stored data. The computing device generates a count of items detected within the location by incrementing a previous count based on the no match and by foregoing a count increment based on the match.

20 Claims, 12 Drawing Sheets

DE-DUPLICATING REDUNDANT DATA FOR DATA AGGREGATION

BACKGROUND

Storage facilities can store products in pallets and totes, which may move about the storage facility. Without accurate tracking of the pallets and totes, these items may go missing, or the storage facility may acquire more pallets and totes than necessary for storing the products. So, it may be desirable to regularly count the pallets and totes and determine their locations within storage facilities.

BRIEF DESCRIPTION OF THE DRAWINGS

Various embodiments in accordance with the present disclosure will be described with reference to the drawings, in which.

DETAILED DESCRIPTION

Figure 1:
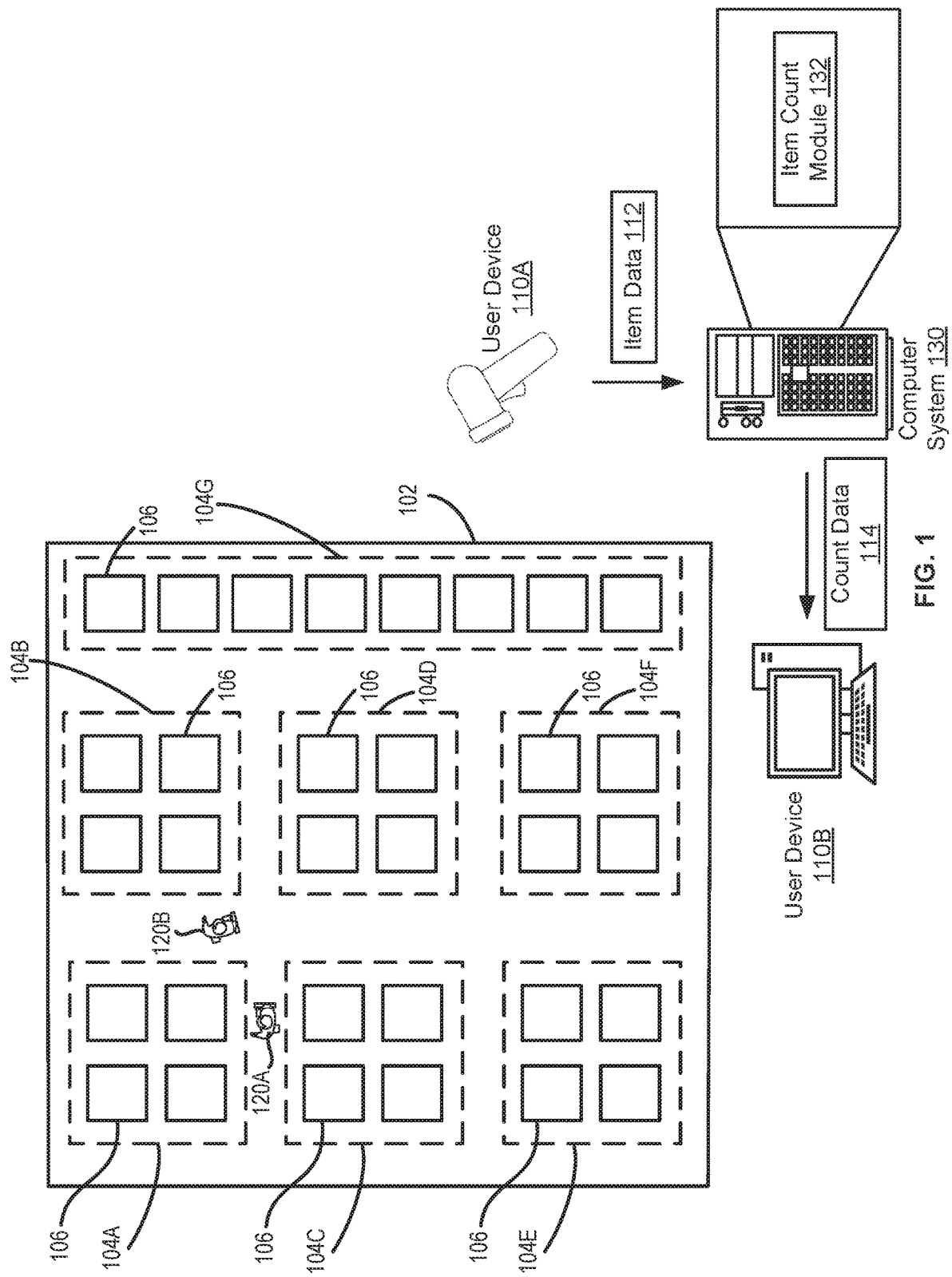
FIG. 1 illustrates a block diagram of an overall context of de-duplicating redundant data for data aggregation, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, de-duplicating redundant data for data aggregation. A computer system associated with de-duplicating redundant data can receive first data identifying first items. The first items can be, for instance, containers used in a storage facility (although the embodiments of the present disclosure are not limited to this type of items). The first data can be radio-frequency identification (RFID) reads of RFID tags associated with the first items (or some other type of data indicating that the first items are detected, such as computer vision data including images showing the first items). The computer system determines that a first data portion and a second data portion indicate that a same item is detected to be within a location by comparing the first data portion and the second data portion. The computer system generates second data by removing the second data portion from the first data. The computer system then queries a data store storing previously stored data identifying second items. Based on a comparison between the previously stored data and the second data, the computer system can determine either that no match exists between the first data portion and the previously stored data, or that a match exists between a third data portion of the second data and the previously stored data. In other words, the computer system can determine whether the second data includes a detection (e.g., an RFID read or an image) for a same item for which there already exists a previous detecting. The computer system generates a count of items detected within the location by incrementing a previous count based on the no match and by foregoing a count increment based on the match.

To illustrate, consider an example of a system determining storage items in an item storage facility. The storage items can be tops, bottoms, and sleeves of pallets in the item storage facility. Each item (e.g., a top, a bottom, or a sleeve) can be associated with a set of RFID tags that uniquely identify the item (e.g., by encoding the same identifier of the item). A user can scan the RFID tags of the items at a location using a handheld RFID scanning device so that a count of each type of item, and an overall count for the item storage facility, can be determined. As the user device scans the RFID tags, duplicate RFID reads of the same item may be received. The user device itself can perform a first de-duplication procedure to check for duplicate RFID reads in a batch prior to sending the batch to a computer system. Then, the computer system can receive the batches and perform additional de-duplication checks. A first de-duplication check can involve the computer system comparing the RFID reads of a first batch to each other and/or to RFID reads of other batches for the location. If there are redundant RFID reads, the computer system may determine which read to keep based on various factors (e.g., timestamps of the RFID reads, sessions of the reads, etc.). The computer system can then perform a second de-duplication check to compare the RFID reads to previously stored RFID reads and similarly determine which RFID reads to keep based on the same or other factors (e.g., signal strength, location, location type, etc.). Once the RFID reads are de-duplicated, the computer system generates a count of items detected within the location by incrementing and decrementing the count according to the de-duplication checks. As a result, each item can be counted only once and can be accurately tracked throughout the storage facility.

Embodiments of the present disclosure provide several technical advantages over conventional de-duplication techniques. For instance, since the user device that scans the RFID tags performs an initial de-duplication procedure in data batches, the amount of de-duplication processing for the computer system can be reduced. In addition, the computer system can process RFID reads differently depending on a type of location, so computing requirements can be reduced in instances in which extensive processing is not necessary. Further, by performing a first de-duplication prior to a more complex second de-duplication (e.g., one that relies on querying a data store), the computer system can reduce the amount of data it needs to process by removing duplicate data prior to the second de-duplication, while still accurately determining an accurate count.

In the interest of clarity of explanation, various embodiments of the present disclosure are illustrated in connection with RFID technology. However, the embodiments are not limited as such. For example, the embodiments equivalently apply to other RF and non-RF technologies. For instance, other RF technologies can include Bluetooth signals that can be similarly processed. For non-RF technologies, computer vision can be used. Here, instead of an RFID read that includes an item identifier (ID) and a received signal strength indicator (RSSI), computer vision data (e.g., processed image data) indicates a detected item and a confidence level. The detected data can used in place of the item ID from the RFID read and the confidence level can be used instead of the RSSI.

FIG. 1 illustrates a block diagram of an overall context of de-duplicating redundant data for data aggregation, according to embodiments of the present disclosure. A computer system 130 can communicate with user devices 110A-B. The computer system 130 is capable of supporting various computing services including, for instance, data de-duplication and item count services. In particular, the computer system 130 includes one or more processors, one or more memories storing computer-readable instructions for a data de-duplication service and/or for an item count service, one or more network interfaces, and/or other computing components for communication with the user devices 110A-B. The user device 110B is an example of a computer system that can include a device (e.g., laptop, desktop, mobile device, etc.), a combination of computer hardware and program code that provides an online service to an endpoint, or a distributed system that includes such combination and endpoint.

In an example, the user device 110A sends item data 112 to the computer system 130. The item data 112 includes a batch of RFID reads that are associated with a location of an item storage facility 102 (e.g., one of the locations 104A, 104B, 104C, 105,D, 104E, 104F, 104G show in FIG. 1, and generally referred to as a "location 104"). Each location 104 includes items 106, such as tops, bottoms, and sleeves of pallets and totes, and each item 106 can be associated with a set of RFID tags that can be scanned by the user device 110A. A user 120 can operate the user device 110A during a session to generate the item data 112, which can include metadata indicating a storage facility identifier of the item storage facility 102, a location identifier of a location 104, a session identifier, item identifiers for the items 106, timestamps of the scans of the items 106, and signal strengths of the scans.

During a session, the user device 110A may scan the RFID tag(s) for the same item multiple times, generating a duplicate RFID read for the item. So, the user device 110A may execute a de-duplication procedure of the RFID reads as the user 120A scans a location, such as location 104A. The de-duplication procedure can involve removing duplicated RFID reads in the batch for the same item generated by the user device 110A, so that there is only one RFID read associated with each item in the batch. Once the number of de-duplicated RFID reads generated by the user device 110A exceeds a threshold (e.g., two hundred) and/or once a scan period of time is reached (e.g., twenty seconds), the user device 110A sends the batch of RFID reads (that are de-duplicated) as the item data 112 to the computer system 130.

Upon receiving the item data 112, an item count module 132 of the computer system 130 performs further de-duplication procedures for the batch of RFID reads so that an accurate count of the items 106 can be determined. As further described below, the item count module 132 can de-duplicate the item data 112 based on RFID read removal rules, which can be associated with a type of the location 104. For instance, the type may be wall-to-wall or location specific, where wall-to-wall relates to scanning each of the locations 104A-G of the item storage facility 102 and location specific relates to scanning one of the locations 104A-G. Each type may be associated with a different time window. For example, wall-to-wall locations may be associated with a time window of twenty-four hours and specific locations may be associated with a time window of one hour. In addition, the item count module 132 can de-duplicate the item data 112 based on a query to a data store that stores previous RFID reads that are associated with the location 104 and that are generated within the time window.

Once the item count module 132 de-duplicates the RFID reads, the item count module 132 can generate count data 114 by incrementing and decrementing a previous count of the items 106 based on the de-duplication. The count data 114 can indicate a number of each type of item 106 (e.g., top, bottom, and sleeve) in the item storage facility 102. The count data 114 may additionally indicate a location of each item 106 in the item storage facility 102. The computer system 130 can send the count data 114 to the user device 110B for presentation by the user device 110B. For instance, the count data 114 can be presented at a dashboard of the user device 110B to indicate to a user how many items 106 are present in the item storage facility 102. Further, although the computer system 130 is illustrated as processing the data for a single storage facility 102, the processing can be similarly applied to multiple storage facilities. In this case, the item count module 132 may associate count data with each storage facility and may, at a higher level of granularity, show counts across multiple ones of the storage facilities. The dashboard can show the counts per location in a facility, per facility, per similar locations across multiple facilities, and/or per group of facilities.

Figure 2:
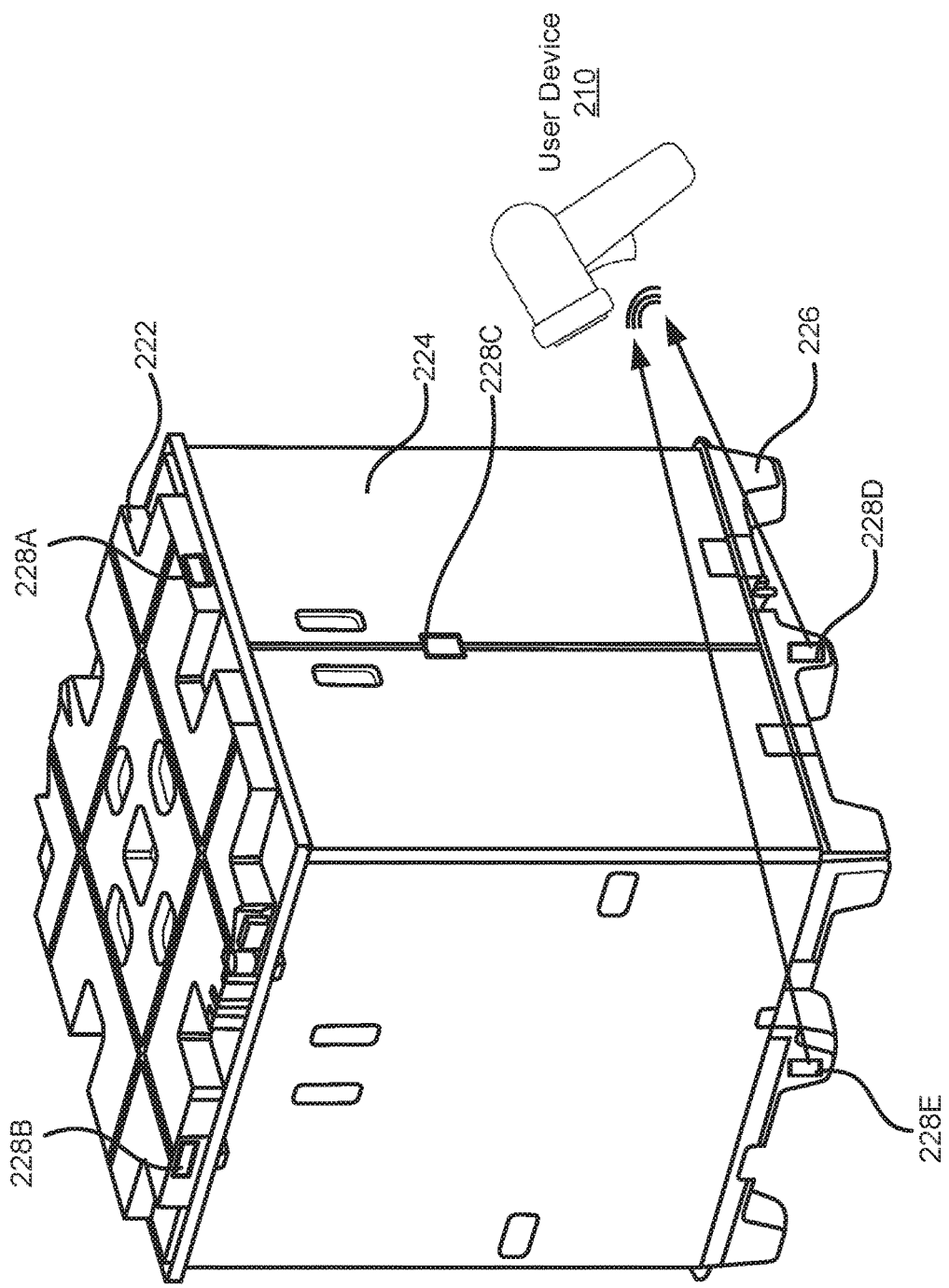
FIG. 2 illustrates a user device receiving a duplicate radio-frequency identification read, according to embodiments of the present disclosure.

FIG. 2 illustrates a user device 210 receiving a duplicate RFID read, according to embodiments of the present disclosure. As a user (e.g., the user 120 in FIG. 1) scans items in an item storage facility (e.g., item storage facility 102 in FIG. 1), the user may unintentionally scan the same item multiple times, generating multiple RFID reads for the item. As illustrated in FIG. 2, a pallet can include a top 222, a sleeve 224, and a bottom 226. Each of the top 222, the sleeve 224, and the bottom 226 can be an item and can be associated with a unique identifier. In addition, each of the top 222, the sleeve 224, and the bottom 226 can have at least one RFID tag 228 that can be scanned by the user device 210 to determine a count of items in the item storage facility. Each side of the top 222 and the bottom 226 can include an RFID tag 228 and every other side of the sleeve 224 can include an RFID tag 228. For instance, the top 222 can include RFID tags 228A-B (having the same item identifier), the sleeve 224 can include RFID tag 228C, and the bottom 226 can include RFID tags 228D-E (having the same item identifier).

The multiple RFID tags 228 on an item can simplify scanning the items, since the RFID tags 228 can be scanned without the items having to be rotated or otherwise manipulated. However, the multiple RFID tags 228 on an item may be scanned by the user device 210, resulting in a duplicate RFID read for the item. As illustrated, the user device 210 may receive an RF emission from both the RFID tag 228D and the RFID tag 228E on the bottom 226. So, if de-duplication was not performed, the bottom 226 would be counted twice instead of just once, resulting in an inaccurate count of bottoms in the item storage facility.

Figure 3:
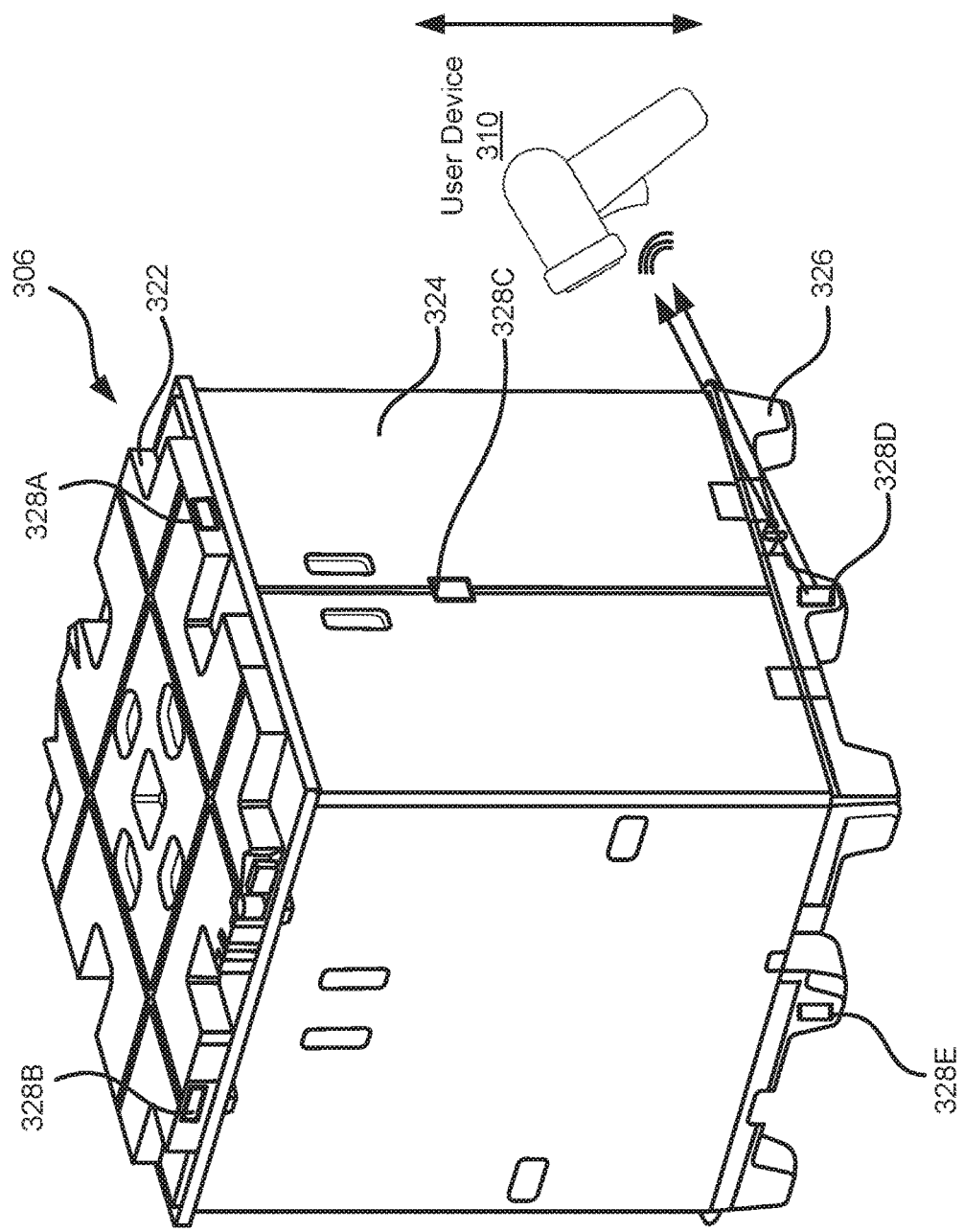
FIG. 3 illustrates a user device receiving another duplicate radio-frequency identification read, according to embodiments of the present disclosure.

FIG. 3 illustrates a user device 310 receiving another duplicate RFID read, according to embodiments of the present disclosure. Similar to FIG. 2, a pallet includes a top 322 with RFID tags 328A-B, a sleeve 324 with RFID tag 328C, and a bottom with RFID tags 328D-E. In addition, to multiple RFID tags of an item being scanned by the user device 310, a duplicate RFID read may be generated by the user device 310 receiving an RF emission from the same RFID tag multiple times. For instance, a user may move the user device 310 up and down along the pallet to scan each of the items, which can result in the user device 310 scanning the RFID tag 328D of the bottom 326 multiple times. So, if de-duplication was not performed, the bottom 326 would be counted multiple times instead of just once, resulting in an inaccurate count of bottoms in the item storage facility.

Figure 4:
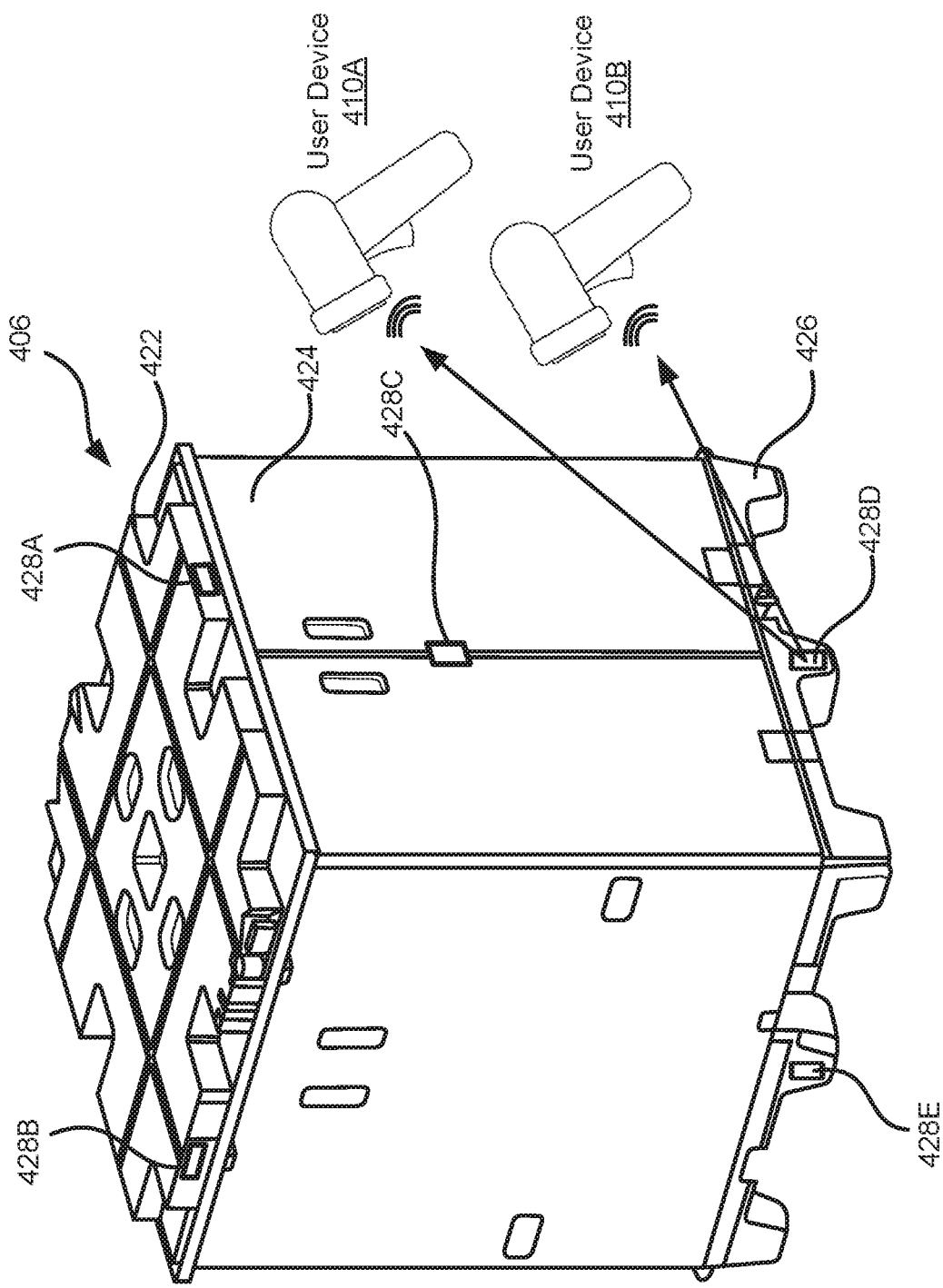
FIG. 4 illustrates two user devices generating a duplicate radio-frequency identification read, according to embodiments of the present disclosure.

FIG. 4 illustrates two user devices 410A-B generating a duplicate RFID read, according to embodiments of the present disclosure. Similar to FIGS. 2 and 3, a pallet includes a top 422 with RFID tags 428A-B, a sleeve 424 with RFID 428C, and a bottom with RFID tags 428D-E. The user device 410A can be associated in a first session with a first location of an item storage facility, whereas the user device 410B can be associated in a second session with a second location of the item storage facility. Each session corresponds to RFID reads by the corresponding device and the RFID reads of such a session can be recognized by a computer system (e.g., the computer system 130) as originating from a same user device and processed together by the computer system. Both of the user devices 410A-B may read the RFID tag 428D of the bottom 426, which can result in the bottom 426 being associated with both locations. As described herein below, a de-duplication procedure can involve determining which location to associate the bottom 426 with based on a signal strength of the RFID reads for the bottom 426 and/or on a timestamp associated with the RFID reads for the bottom 426.

Figure 5:
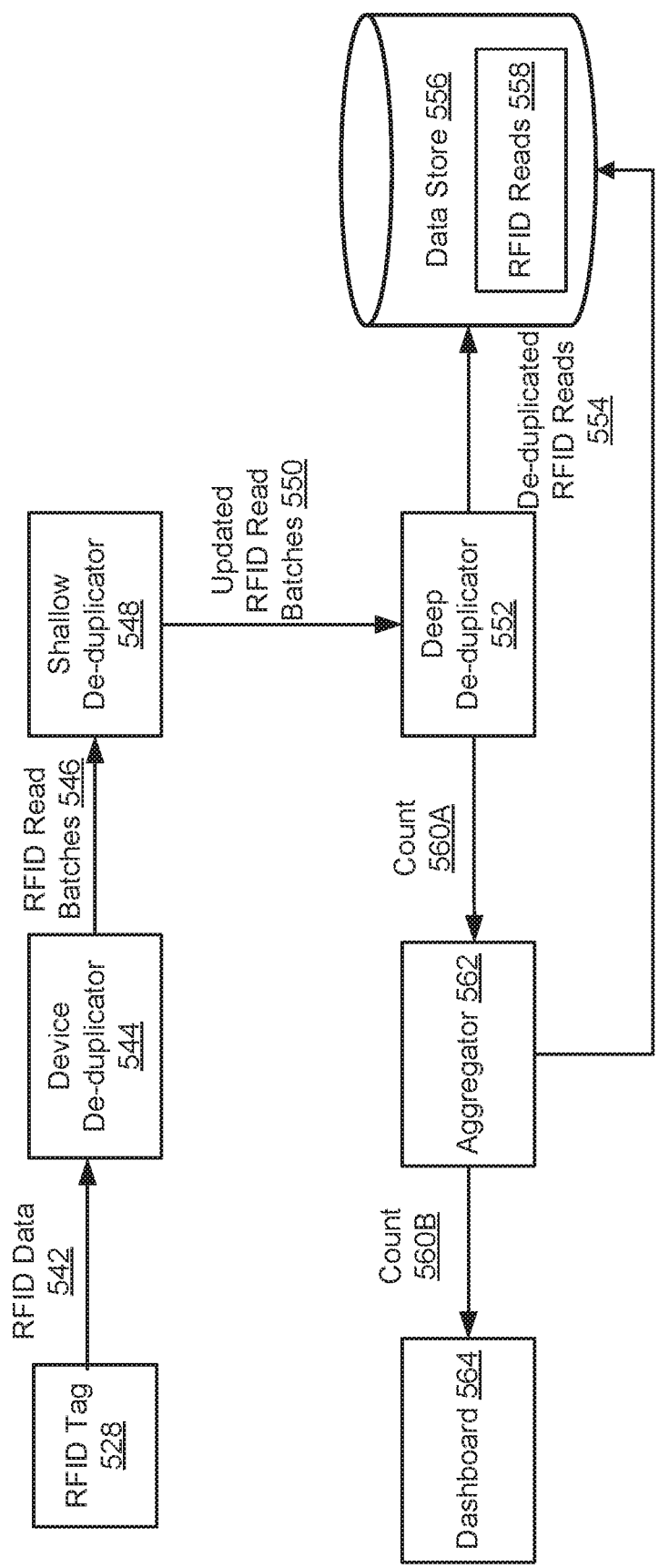
FIG. 5 illustrates a block diagram of components of a system for de-duplicating redundant data for data aggregation, according to embodiments of the present disclosure.

FIG. 5 illustrates a block diagram of components of a system for de-duplicating redundant data for data aggregation, according to embodiments of the present disclosure. During a session, a device de-duplicator 544 of the user device, such as user device 110A in FIG. 1, can receive RFID data 542 from an RFID tag 528 associated with an item at a location of a storage facility. The RFID data 542 can indicate an item identifier of the item (where this item identifier is emitted by the RFID tag 528 in an RF response to an RF signal of the user device), a timestamp (which can correspond to the time when the RF response is received by the user device), and a signal strength (e.g., an RSSI of the RF response).

In an example, the RFID tag 528 includes RF circuitry (e.g., an RF antenna), a memory, and a processor. The memory can store executable instructions associated with transmitting RF responses. For instance, the memory can store associations between session types and transmission states. A first session type can be associated with a first transmission state, whereby after emitting a first RF response, the next RF response cannot be emitted until after a first time interval elapses. A second session type can be associated with a second transmission state, whereby after emitting a first RF response, the next RF response cannot be emitted until after a second time interval elapses, where this second time interval is shorter than the first time interval. The processor can execute such instructions. In an illustrative use case, the user device can indicate (e.g., via an RF emission) the type of session and the RFID tag 528 can then determine the corresponding state and time interval to use given the stored associations. As such, upon receiving a first RF signal emitted the user device, the RFID tag 528 emits a first RF response. Upon receiving a second RF signal emitted by the user device, this RF signal may not be received or if received no RF response is sent by the RFID tag 528 unless the RF signal is emitted (or, equivalently, received) after the time interval elapses.

The device de-duplicator 544 determines whether the RFID data 542 matches another RFID read received by the user device in a same batch of RFID reads. If the RFID data 542 matches another RFID read, the RFID data 542 can be removed. The device de-duplicator 544 generates RFID read batches 546 from scanning multiple RFID tags and de-duplicating the RFID data until a threshold number of RFID reads is generated and/or until an expiration of a time window is reached. Once the threshold and/or time window expiration are met, the device de-duplicator 544 sends the RFID read batch 546 to a shallow de-duplicator 548 of a computer system (e.g., computer system 130 in FIG. 1).

In some examples, the device de-duplicator 544 can receive previously stored RFID reads 558 for the location. In such examples, the RFID read batches 546 may only include RFID reads that are different from the previously stored RFID reads 558. In particular, the device-duplicator 544 can compare the RFID reads in a batch to the received RFID reads (by comparing the read identifies to the received identifiers). If an RFID read of the batch matches a received RFID read, this RFID read is removed from the batch.

The shallow de-duplicator 548 receives the RFID read batches 546 for a location during the session. The shallow de-duplicator 548 compares the RFID reads within a same batch and/or RFID reads across the RFID read batches 546 to determine whether any RFID reads of the RFID read batches 546 are for the same item (e.g., by comparing the read identifies). If so, the shallow de-duplicator 548 removes duplicate RFID reads to generate updated RFID read batches 550.

In an example, the deep de-duplicator 552 is also part of the computer system. The deep de-duplicator 552 receives the updated RFID read batches 550 and checks the RFID reads of the updated RFID read batches 550 against stored RFID reads 558 from a data store 556. Here, the check can also compare read identifiers with stored identifiers, among other possible comparisons (e.g., timestamps, signal strengths, session identifiers, etc.). If the deep de-duplicator 552 determines that there is a match between the updated RFID read batches 550 and the stored RFID reads 558, the deep de-duplicator can de-duplicate the RFID reads according to de-duplication rules. For example, the de-duplication rules may be based on a location type of the location, the session, the timestamps, and/or the signal strength of the RFID reads, as further described herein below. The deep de-duplicator 552 then sends de-duplicated RFID reads 554 to the data store 556 to be stored. The input and/or output data of each of the shallow de-duplicator 548 and the deep de-duplicator 552 can be stored, either in the same data store (e.g., data store 556) or different data stores. If the data is stored in different data stores, they can have a same storage type or different storage types (e.g., temporary or permanent). In addition, the deep de-duplicator 552 sends a count 560A of items based on the de-duplicated RFID reads 554 to an aggregator 562 of the computer system. For instance, the count 560A can indicate a number of each type of item that is included in the de-duplicated RFID reads 554. The aggregator 562 aggregates the count 560A with additional counts for other sessions and locations to determine an overall count 560B of items at the storage facility. Upon generating the count 560B, the aggregator 562 outputs the count 560B to a dashboard 564, which may be part of a user device, such as user device 110B in FIG. 1. A user can then visualize the count 560B and make decisions associated with managing the items.

Figure 6:
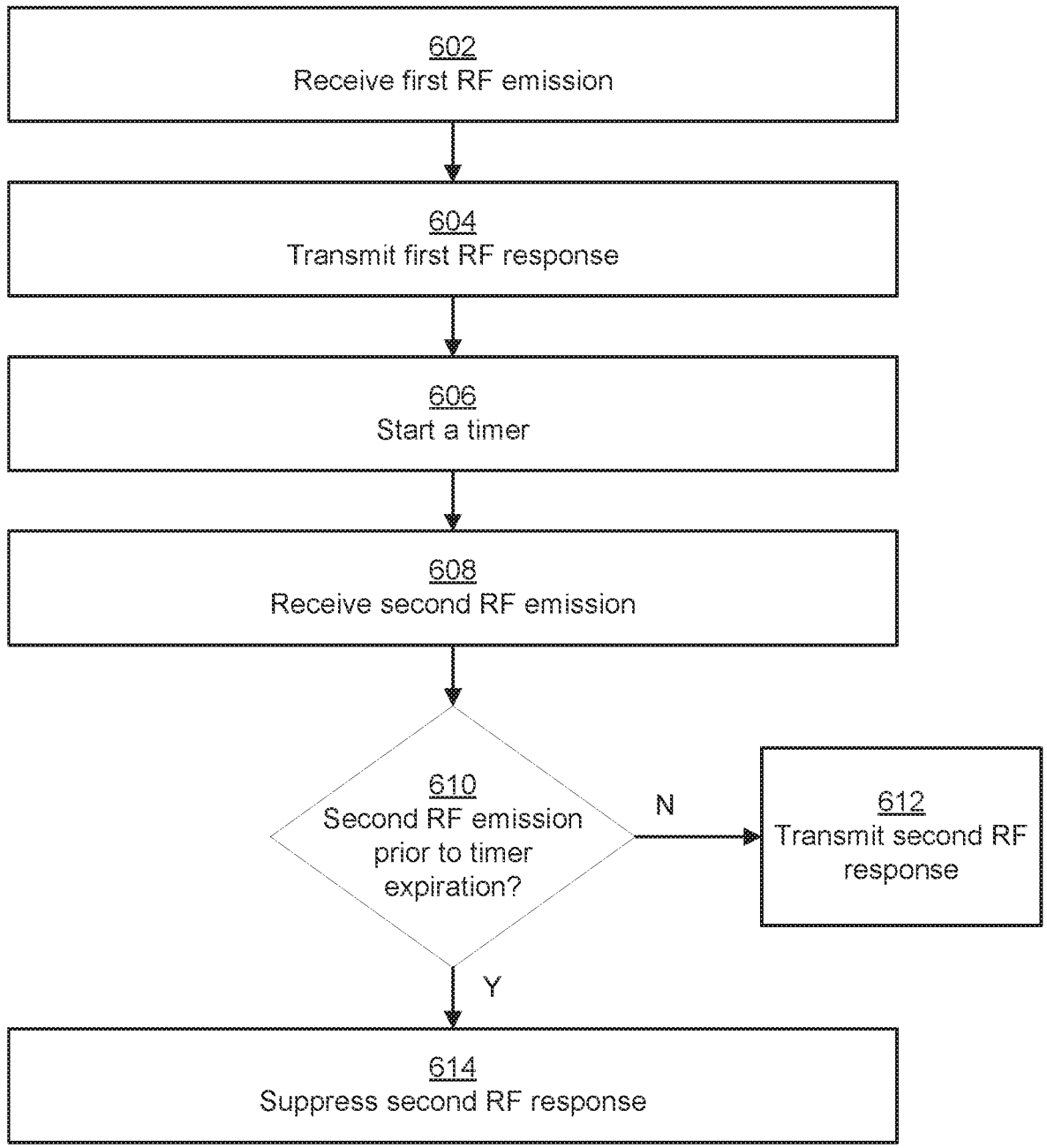
FIG. 6 illustrates an example of a flow for a radio-frequency identification tag sending radio frequency emissions, according to embodiments of the present disclosure.

FIG. 6 illustrates an example flow for a process associated with data de-duplication. Operations of the flow can be performed by an RFID tag, such as the RFID tag 228. Some or all of the instructions for performing the operations can be implemented as hardware circuitry and/or stored as computer-readable instructions on a non-transitory computer-readable medium of the RFID tag. As implemented, the instructions represent modules that include circuitry or code executable by processor(s) of the RFID tag. The use of such instructions configures the RFID tag to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 6 illustrates an example of a flow for an RFID tag sending radio frequency emissions, according to embodiments of the present disclosure. In an example, the flow includes operation 602, where an RFID tag receives a first RF emission. The first RF emission is received from a user device scanning RFID tags during a session. The RF emission indicates the session or a type of the session to the RFID tag. The RFID tag is associated with an item at a location of a storage facility.

In an example, the flow includes operation 604, where the RFID tag transmits a first RF response. The first RF response indicates an item identifier of the item, a timestamp of the first RF response, and a signal strength of the first RF response. The user device receives the first RF response from the RFID tag. The first RF response can be emitted upon determining that a time interval to use for the session has elapsed or upon determining that the RF response is the first RF response that is being sent.

In an example, the flow includes operation 606, where the RFID tag starts a timer. The RFID tag has a processor and a memory that stores a value of the timer for different types of sessions. The maximum value of the timer corresponds to the time interval to use for the session. So, based on the session or the type of session, the RFID tag determines the value for the timer. For instance, the RFID tag may start the timer for five seconds based on the session type indicated in the first RF emission.

In an example, the flow includes operation 608, where the RFID tag receives a second RF emission. The second RF emission can be received from the user device.

In an example, the flow includes operation 610, where the RFID tag determines whether the second RF emission is received prior to expiration of the timer. If so, the flow proceeds to operation 614. Otherwise, the flow proceeds to operation 612.

In an example, the flow includes operation 612, where the RFID tag transmits a second RF response. Since the timer has expired, the second RF response is sent to the user device and includes the item identifier of the item, a timestamp of the second RF response, and a signal strength of the second RF response. Transmitting the second RF response may result in a duplicate RFID read for the item.

In an example, the flow includes operation 614, where the RFID tag suppresses the second RF response. Upon determining that the second RF emission is received prior to the timer expiring, the RFID tag suppresses the second RF response so that the user device does not receive a second RFID read from the RFID tag. This can reduce a likelihood that duplicate RFID reads that are received by the user device and/or can reduce the number of such RFID reads.

Figure 7:
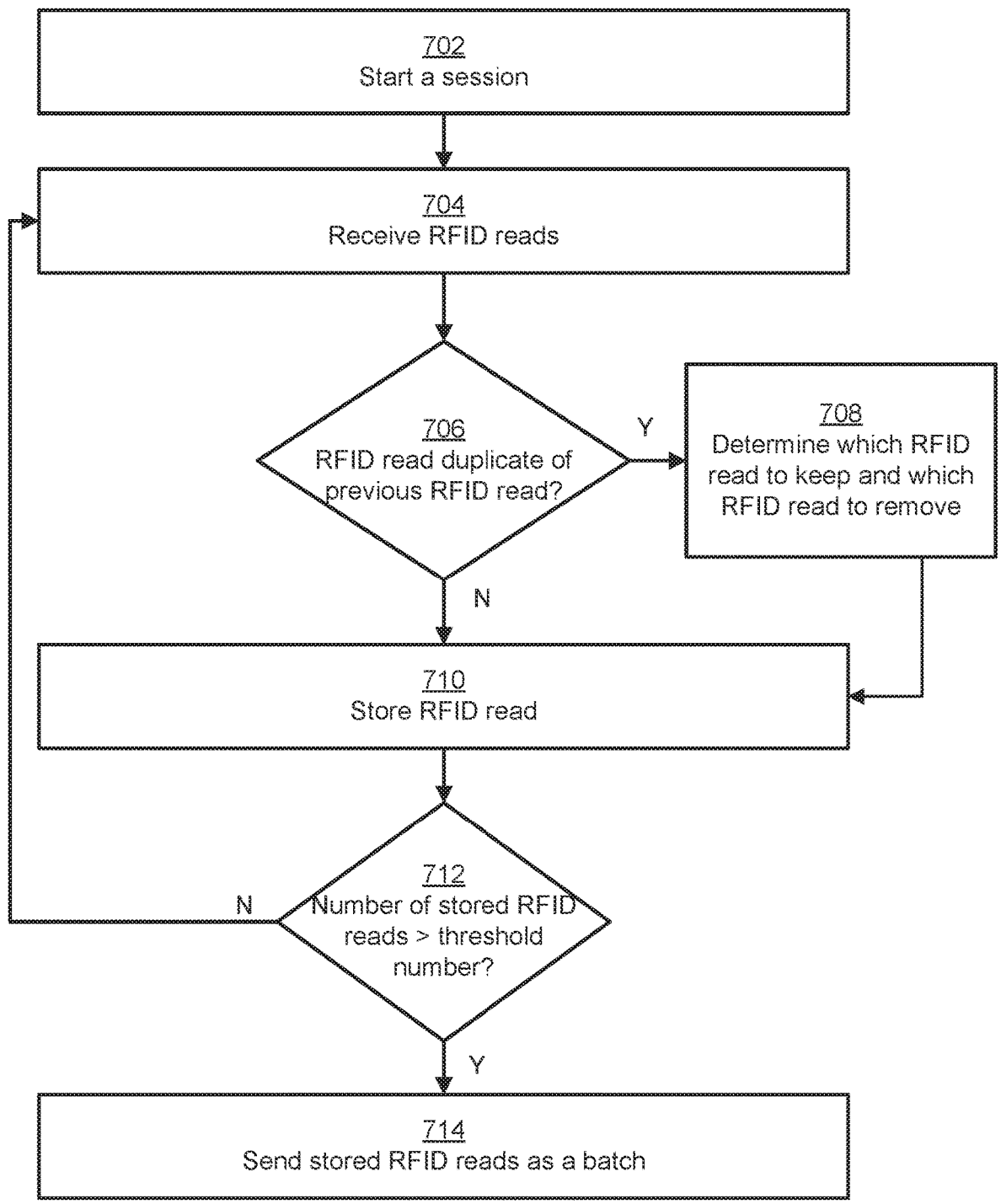
FIG. 7 illustrates an example of a flow for a handheld device performing data de-duplication, according to embodiments of the present disclosure.

FIG. 7 illustrates an example flow for a process associated with data de-duplication. Operations of the flow can be performed by a user device, such as the user device 110A. Some or all of the instructions for performing the operations can be implemented as hardware circuitry and/or stored as computer-readable instructions on a non-transitory computer-readable medium of the user device. As implemented, the instructions represent modules that include circuitry or code executable by processor(s) of the user device. The use of such instructions configures the user device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 7 illustrates an example of a flow for a handheld device performing data de-duplication, according to embodiments of the present disclosure. In an example, the flow includes operation 702, where the user device starts a session. The session can be associated with a session identifier, a location in a storage facility, and a location type of the location. The session can be started based on receiving user input at a user interface of the user device. The user interface can correspond to an application (e.g., a scanning application) executing on the user device.

In an example, the flow includes operation 704, where the user device receives RFID reads. The user device can send RF emissions to RFID tags associated with items in the storage facility. The RFID reads are received as RF responses from the RFID tags. The RFID reads indicate item identifiers of the items, timestamps of the RF responses, and signal strengths of the RF responses.

In an example, the flow includes operation 706, where the user device determines whether an RFID read is a duplicate of a previous RFID read. The user device can compare each RFID read to the other RFID reads to determine if they are for the same item. If so, the user device can proceed to operation 708. Otherwise, the user device can proceed to operation 710.

In an example, the flow includes operation 708, where the user device determines which RFID read to keep and which RFID read to remove. The user device may determine to keep the RFID read with a later timestamp and remove the RFID read with an earlier timestamp. Additionally or alternatively, the user device may determine to keep the RFID read with a stronger signal strength and remove the RFID read with a weaker signal strength.

In an example, the flow includes operation 710, where the user device stores the RFID read. The user device stores (e.g., in a memory buffer) the RFID read if it is not a duplicate of a previous read, as determined in operation 706. Or, the user device stores the RFID read that is determined to be kept during operation 708.

In an example, the flow includes operation 712, where the user device determines whether the number of stored RFID reads are greater than a threshold number. For example, the threshold may be one-hundred, so the user device can determine whether the number of stored RFID reads that have been de-duplicated is greater than one-hundred. If so, the user device proceeds to operation 714. Otherwise, the user device returns to operation 704 and receives additional RFID reads for the batch.

In an example, the flow includes operation 714, where the user device sends the stored RFID reads as a batch. The batch includes the de-duplicated RFID reads and is sent in association with a session identifier. Upon sending the batch, a next batch can be started (e.g., the memory buffer cleared to store the next set of RFID reads). A computer system can receive the batch and perform additional de-duplication procedures based on other batches of RFID reads for the session previously stored RFID reads for the location and the storage facility overall. The computer system can then determine a count of the items in the storage facility.

FIGS. 8-11 illustrate example flows for processes associated with data de-duplication. Operations of the flows can be performed by a computer system, such as the computer system 130. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

Figure 8:
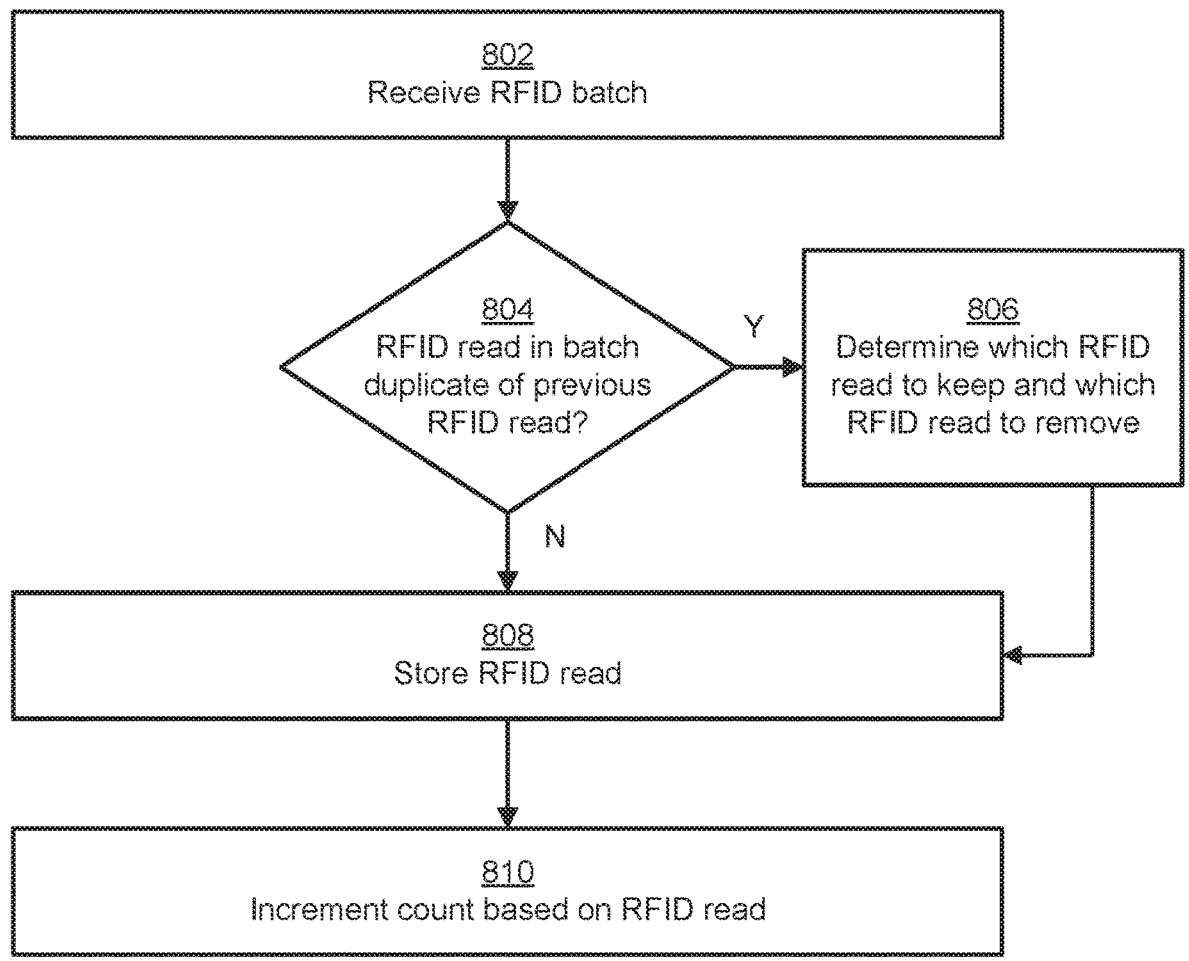
FIG. 8 illustrates an example of a flow for shallow de-duplication of data, according to embodiments of the present disclosure.

FIG. 8 illustrates an example of a flow for shallow de-duplication of data, according to embodiments of the present disclosure. In an example, the flow includes operation 802, where the computer system receives an RFID batch. The RFID batch includes RFID reads of RFID tags associated with items in a storage facility. The RFID reads are received by a user device as RF responses from the RFID tags and indicate item identifiers of the items, timestamps of the RF responses, and a signal strengths of the RF responses. The user device sends the RFID batch to the computer system after de-duplicating RFID reads in the RFID batch. The RFID batch can be associated with a session identifier, where the user device can also indicate the session identifier to the computer system. The user device can start a session and generate a session identifier for the session. Alternatively, the computer system can generate the session identifier and inform the user device to use the session identifier prior to the start of the session. In both situations, the session can be associated with a location of the storage facility (e.g., wall-to-wall location or a specific location). This association can be based on user input at a user interface of the user device, in which case, the location can be indicated by the user device to the computer system. Alternatively or additionally, the location can be selected by the computer system and indicated to the user device prior to the start of the session.

In an example, the flow includes operation 804, where the computer system determines whether an RFID read in the batch is a duplicate of a previous RFID read. The computer system can compare each RFID read in the batch to other RFIDs of the batch and/or to RFID reads in other batches to determine if there are any matches for the same item. These other batches can be associated with the same session identifier and can be received from the same user device (or from a set of user devices using the same session identifier) If so, the computer system can proceed to operation 806. Otherwise, the computer system can proceed to operation 808.

In an example, the flow includes operation 806, where the computer system determines which redundant RFID read to keep and which RFID read to remove. The computer system can determine de-duplication rules that can indicate that the RFID read with a later timestamp is to be kept and the RFID read with an earlier timestamp is to be removed. Alternatively, the de-duplication rules may indicate that the RFID read with a stronger signal strength is to be kept and the RFID read with a weaker signal strength is to be removed. Other de-duplication rules are also possible.

In an example, the flow includes operation 808, where the computer system stores the RFID read. The computer system stores the RFID read if it is not a duplicate of a previous read, as determined in operation 804. Or, the computer system stores the RFID read that is determined to be kept during operation 806.

In example, the flow includes operation 810, where the computer system increments a count based on the RFID read. The count is a count of items at the location. The computer system can increment the count if the RFID read did not match a previous RFID read. The computer system does not increment the count if the RFID read was a duplicate of a previous RFID read since the item was previously included in the count. This operation may not be performed if a deep de-duplication process is performed similar to the flow illustrated in FIG. 9.

Figure 9:
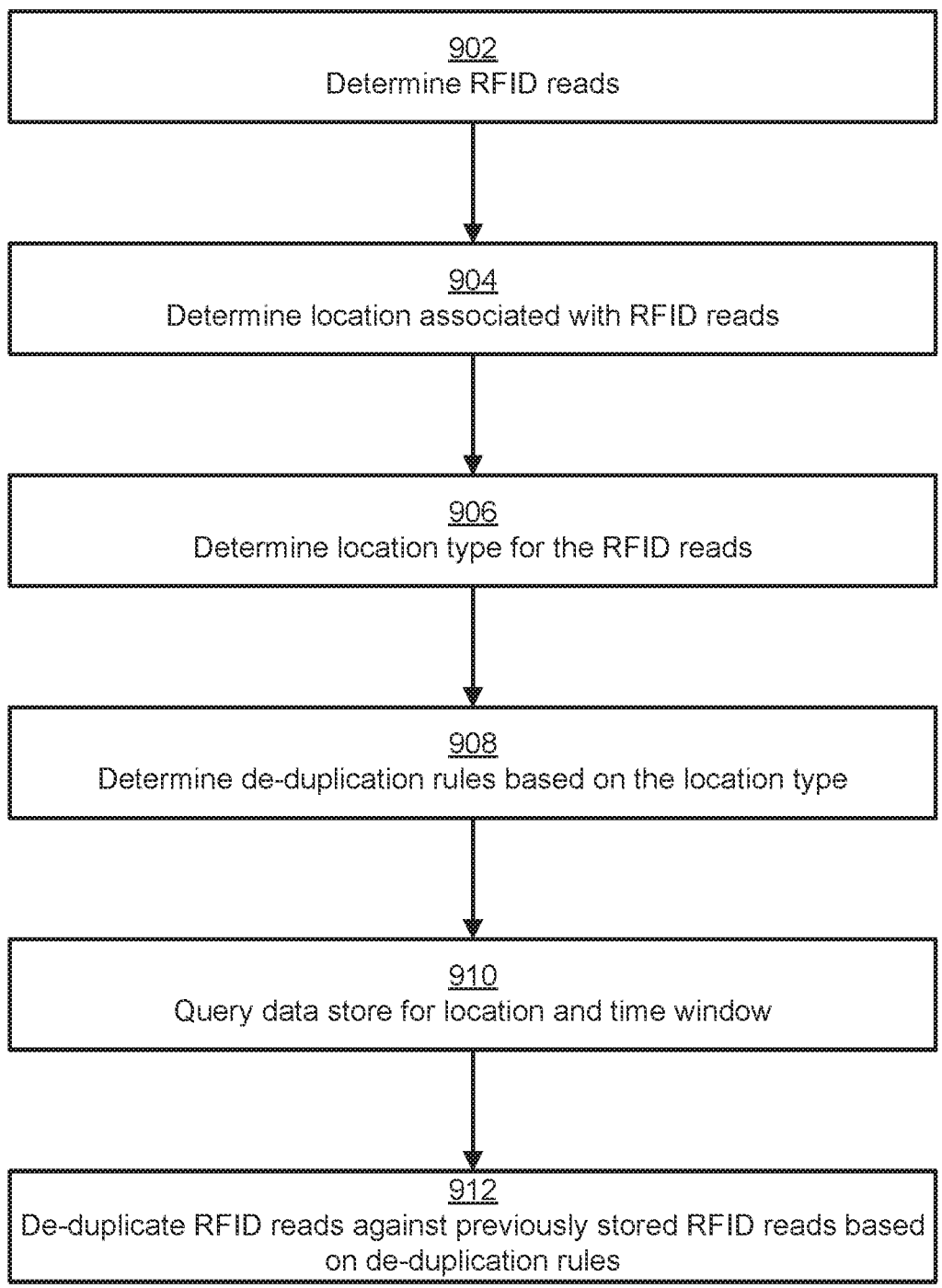
FIG. 9 illustrates an example of a flow for deep de-duplication of data, according to embodiments of the present disclosure.

FIG. 9 illustrates an example of a flow for deep de-duplication of data, according to embodiments of the present disclosure. In an example, the flow includes operation 902, where the computer system determines RFID reads. The RFID reads can be multiple batches of RFID reads of items received during a session for a location in a storage facility. The batches of RFID reads can be previously de-duplicated against each other, as described in FIG. 8. The RFID reads are received by a user device as RF responses from the RFID tags and indicate item identifiers of the items, timestamps of the RF responses, and a signal strength of the RF responses. The user device then sends the RFID reads to the computer system as the batches.

In an example, the flow includes operation 904, where the computer system determines a location associated with the RFID reads. The location can be determined based on metadata received with the RFID reads that indicates a storage facility identifier, a location identifier, and a session identifier for the RFID reads.

In an example, the flow includes operation 906, where the computer system determines a location type for the RFID reads. The location can be associated with a type, which can be determined from the location identifier. As an example, the type of the location may be a wall-to-wall location or a specific location of the storage facility. Each type of location may be associated with a time window for determining duplicate RFID reads. For instance, wall-to-wall locations may be associated with a time window of twenty-four hours and specific locations may be associated with time windows of one hour.

In an example, the flow includes operation 908, where the computer system determines de-duplication rules based on the location type. A de-duplication procedure is performed based on the de-duplication rules. The de-duplication procedure involves determining matches between the RFID reads and the previously stored RFID reads. A match can be found when an item identifier indicated in an RFID read of a batch is the same as an item identifier in a previously stored RFID read. The de-duplication procedure may further be performed based on the session identifier(s) and the timestamps for the RFID reads. For instance, if RFID reads are received for the same item during the time window but for two different session identifiers, the computer system may determine that the RFID reads are not duplicates. However, the computer system may determine that a first RFID read for an item has a more recent timestamp than a second RFID read for the item and that a difference between the timestamps is within a threshold time difference, and then store the first RFID read instead of the second RFID read. Based on the type of the location, the session identifier(s), and the timestamps, the de-duplication rules may vary, as described further in FIGS. 10 and 11.

In an example, the flow includes operation 910, where the computer system queries a data store for the location during the time window. The time window is the time window that is associated with the type of the location. So, the computer system determines all RFID reads that are received for the location within the time window.

In an example, the flow includes operation 912, where the computer system de-duplicates the RFID reads against previously stored RFID reads based on the de-duplication rules. The computer system can remove redundant RFID reads based on the de-duplication rules for the type of the location. Once the redundant RFID reads are removed and non-redundant RFID reads are stored, the computer system can determine a count of items in the location. For instance, a final set of RFID reads is generated by removing the redundant RFID reads. Each RFID read in the set includes an item identifier that indicates an item. The total number of these indicated items is tallied to determine the count.

Figure 10:
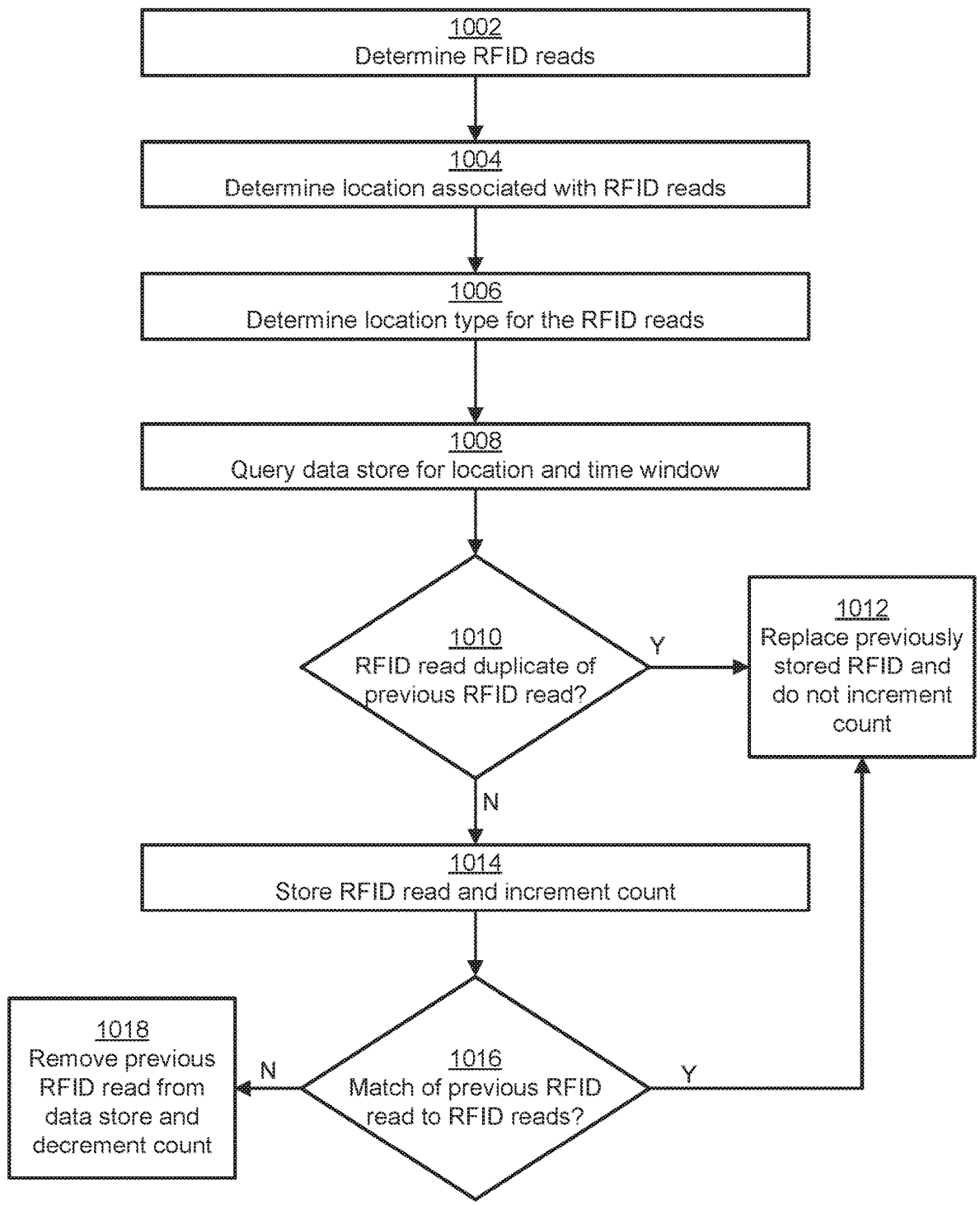
FIG. 10 illustrates an example of a flow for deep de-duplication for a wall-to-wall location, according to embodiments of the present disclosure.

FIG. 10 illustrates an example of a flow for deep de-duplication for a wall-to-wall location, according to embodiments of the present disclosure. In an example, the flow includes operation 1002, where the computer system determines RFID reads. The RFID reads can be multiple batches of RFID reads of items received for a location in a storage facility. The batches of RFID reads can be previously de-duplicated against each other, as described in FIG. 8. The RFID reads are received by a user device as RF responses from the RFID tags and indicate item identifiers of the items, timestamps of the RF responses, and signal strengths of the RF responses. The user device then sends the RFID reads to the computer system as the batches.

In an example, the flow includes operation 1004, where the computer system determines a location associated with the RFID reads. The location can be determined based on metadata received with the RFID reads that indicates a storage facility identifier, a location identifier, and a session identifier for the RFID reads.

In an example, the flow includes operation 1006, where the computer system determines a location type for the RFID reads. The location can be associated with a type, which can be determined from the location identifier. As an example, the type of the location may be a wall-to-wall location of the storage facility that is associated with a time window of twenty-four hours.

In an example, the flow includes operation 1008, where the computer system queries a data store for the location and the time window. The time window is the time window that is associated with the type of the location. So, the computer system determines all RFID reads that are received for the location within the time window.

In an example, the flow includes operation 1010, where the computer system determines whether an RFID read is a duplicate of a previous RFID read. The computer system compares the previously stored RFID reads to the received RFID reads to determine if there is a match for an item. If an RFID read matches a previous RFID read, the computer system proceeds to operation 1012. Otherwise, the computer system proceeds to operation 1014.

In an example, the flow includes operation 1012, where the computer system replaces the previously stored RFID read and does not increment the count. The computer system can replace the stored RFID read based on the received RFID read having a later timestamp. The computer system may determine which RFID read to keep based on the signal strength of the duplicate RFID reads. For instance, the computer system may determine that the previously stored RFID read is to be stored instead of the received RFID read if the signal strength for the previously stored signal strength is higher than the signal strength of the received RFID read. Alternatively, the computer system may determine that the received RFID read has signal strength that is below a threshold and remove the received RFID read while maintaining the previously stored RFID read based on the signal strength being below the threshold. In any case, the computer system does not increment the count since the item was previously included in the count based on the previously stored RFID read.

In an example, the flow includes operation 1014, where the computer system stores the RFID read and increments the count. Upon determining that the RFID read is not a duplicate of a previously stored RFID read, the computer system determines that the RFID read is for a new item. So, the computer system stores the RFID read and increments the count of the items.

In an example, the flow includes operation 1016, where the computer system determines whether a previous RFID read matches an RFID read in the RFID reads. The computer system compares each of the previously stored RFID reads to the received RFID reads to determine whether each previous RFID read has a match to a received RFID read. If there is a match for the previous RFID read, the computer system returns to operation 1012 to replace the previous RFID read with the received RFID read. Otherwise, the computer system proceeds to operation 1018.

In an example, the flow includes operation 1018, where the computer system removes the previous RFID read from the data store and decrements the count. Since the previous RFID read does not have a match in the received RFID read, the computer system can determine that the item is no longer present at the location. So, the count is decremented so that the item is no longer included in the count for the location.

Figure 11:
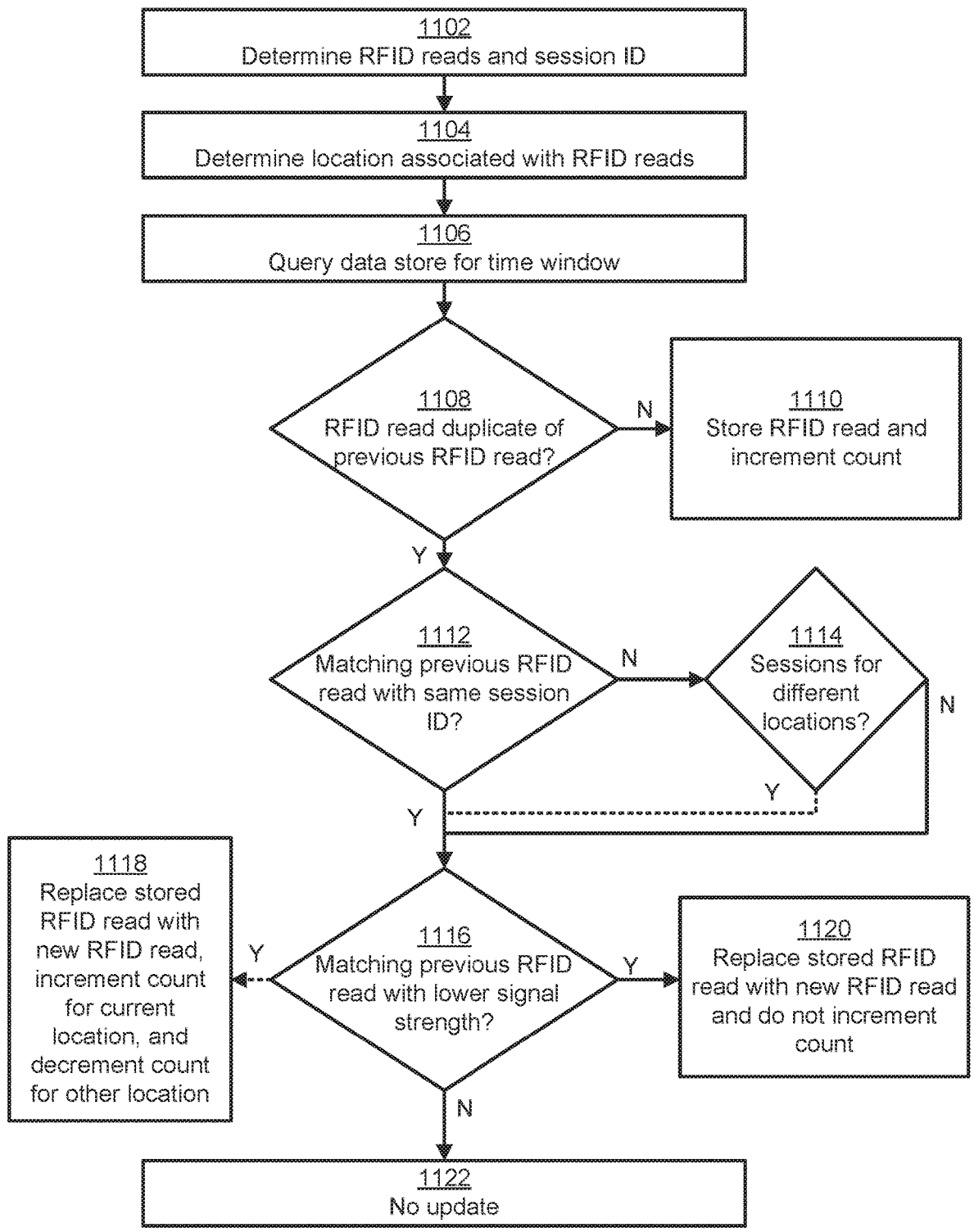
FIG. 11 illustrates an example of a flow for deep de-duplication for a specific location, according to embodiments of the present disclosure.

FIG. 11 illustrates an example of a flow for deep de-duplication for a specific location, according to embodiments of the present disclosure. In an example, the flow includes operation 1102, where the computer system determines RFID reads and a session identifier. The RFID reads can be multiple batches of RFID reads of items received for a location in a storage facility. The batches of RFID reads can be previously de-duplicated against each other, as described in FIG. 8. The RFID reads are received by a user device as RF responses from the RFID tags and indicate item identifiers of the items, timestamps of the RF responses, and signal strengths of the RF responses. The user device then sends the RFID reads to the computer system as the batches. The computer system can receive the session identifier with the RFID reads.

In an example, the flow includes operation 1104, where the computer system determines a location associated with the RFID reads. The location can be determined based on metadata received with the RFID reads that indicates a storage facility identifier, a location identifier, and the session identifier for the RFID reads. The computer system can also determine a location type for the RFID reads from the location identifier. As an example, the type of the location may be a specific location of the storage facility. Each type of location may be associated with a time window for determining duplicate RFID reads. For instance, specific locations may be associated with a time window of one hour.

In an example, the flow includes operation 1106, where the computer system queries a data store for the time window. The time window is the time window that is associated with the type of the location. So, the computer system determines all RFID reads that are received within the time window.

In an example, the flow includes operation 1108, where the computer system determines whether an RFID read is a duplicate of a previous RFID read. The computer system compares the previously stored RFID reads to the received RFID reads to determine if there is a match for an item. If an RFID read matches a previous RFID read, the computer system proceeds to operation 1112. Otherwise, the computer system proceeds to operation 1110.

In an example, the flow includes operation 1110, where the computer system stores the RFID read and increments the count. Upon determining that the RFID read is not a duplicate of a previously stored RFID read, the computer system determines that the RFID read is for a new item. So, the computer system stores the RFID read and increments the count of the items.

In an example, the flow includes operation 1112, where the computer system determines whether the matching previous RFID read has the same session identifier as the received RFID read. The computer system compares the session identifiers for the previous RFID read and the received RFID read to determine whether they are the same. If so, the computer system proceeds to operation 1116. Otherwise, the computer system proceeds to operation 1114.

In an example, the flow includes operation 1114, where the computer system determines whether the sessions for the received RFID read and the matching previous RFID read are for different locations. The computer system compares the location associated with each session to determine whether they are for the same location or different locations. In either case, the computer system proceeds to operation 1116.

In an example, the flow includes operation 1116, where the computer system determines whether the matching previous RFID read has a lower signal strength than the received RFID read. The computer system can compare the stored signal strength for the previous RFID read to the signal strength for the received RFID read. If the sessions are for different locations (as determined in operation 1114) and the previous RFID read has a lower signal strength, the computer system proceeds to operation 1118 (as illustrated with the dashed line). If the sessions are for different locations (as determined in operation 1114) and the previous RFID read has a lower signal strength, the computer system proceeds to operation 1118 (as illustrated with the dashed line). If the sessions are for the same location and the matching previous RFID read has a lower signal strength, the computer system proceeds to operation 1120. The computer system also proceeds to operation 1120 if the matching previous RFID read and the received read are for the same session and the signal strength for the matching previous RFID read is lower than the signal strength for the received RFID read. Otherwise, if the matching previous RFID read signal strength is higher than the received RFID read signal strength, the computer system proceeds to operation 1122.

In an example, the flow includes operation 1118, where the computer system replaces the stored RFID read with the new RFID read, increments the count for the current location, and decrements the count for the location associated with the stored RFID read. Since the new RFID read has a higher signal strength and is associated with a different location, the computer system determines that the item has moved to the location of the received RFID read. So, the computer system updates the timestamp and signal strength for the RFID read and updates the count by decrementing the number of items at the previous location and incrementing the count at the current location.

In an example, the flow includes operation 1120, where the computer system replaces the stored RFID read with the new RFID read and does not increment the count. The item is already accounted for at the location from the previous RFID read, so the computer system only needs to update the signal strength and the timestamp for the RFID read by replacing the previous RFID read with the new RFID read.

In an example, the flow includes operation 1122, where the computer system does not update the previous RFID read or the count. The new RFID read is a duplicate of a previous read, has same session identifier as the previous RFID read, and has a signal strength that is lower than the signal strength of the previous RFID read, so the computer system can maintain the previous RFID read in the data store.

Figure 12:
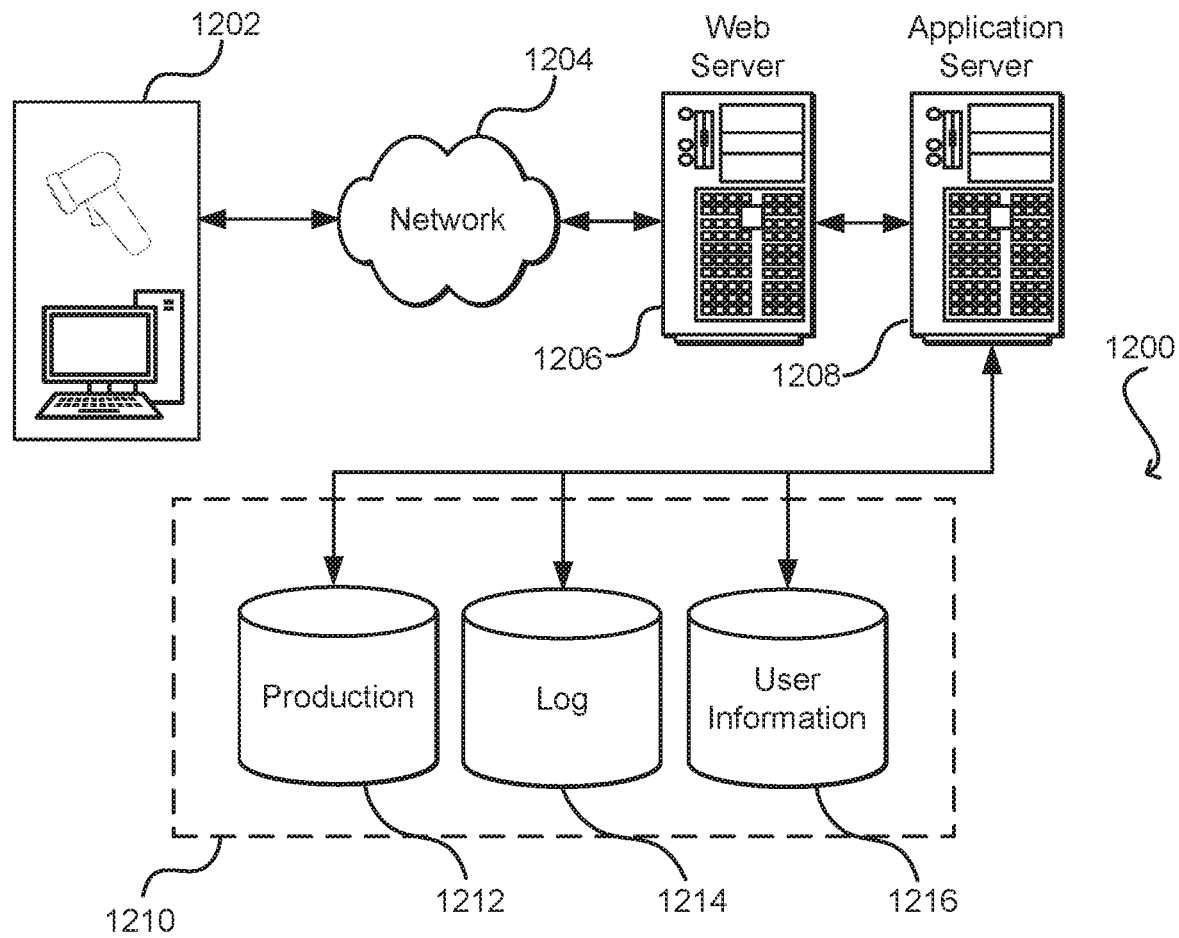
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202 (such as the user device 110A and/or the user device 110B of FIG. 1), which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java*, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
one or more processors; and
one or more memory storing instructions that, upon execution by the one or more processors, configure the system to:
receive, from an RFID scanning device, a first batch of radio frequency identification (RFID) reads, the first batch associated with a location within an item storage facility, the RFID scanning device configured to generate a first RFID read upon a scan of an RFID tag and to suppress a radio frequency (RF) response from the RFID tag until expiration of a timer started after the first RFID read is generated;

determine, based at least in part on a comparison of the first RFID read and a second RFID read from the first batch, that the first RFID read and the second RFID read indicate that a same item is detected within the location;

generate a second batch of RFID reads by at least removing the second RFID read from the first batch, wherein the second batch is smaller in size than the first batch such that processing of queries to a data store for an RFID read de-duplication procedure is reduced by at least using the second batch instead of the first batch;

as part of the RFID read de-duplication procedure:

determine, based at least in part on a type of the location, an RFID read removal rule applicable to remove duplicate RFID reads from the second batch, the RFID read removal rule indicating a time window, and determine, based at least in part on a query to the data store storing previous RFID reads that are associated with the location and that are generated within the time window, that (i) a no match exists between the first RFID read and the previous RFID reads, (ii) a match exists between a third RFID read of the second batch and the previous RFID reads;

generate a count of items detected within the location by at least incrementing a previous count based at least in part on the no match existing between the first RFID read and the previous RFID reads and by at least foregoing a count increment based at least in part on the match existing between the third RFID read of the second batch and the previous RFID reads; and send the count to a computer system configured to track the items such that to enable a more accurate track of the items in the item storage facility.

2. The system of claim 1, wherein the first batch is received based at least in part on execution of another RFID de-duplication procedure on the RFID scanning device, wherein the other RFID de-duplication procedure removes a fourth RFID read generated by the RFID scanning device and associated with the same item.

3. The system of claim 2, wherein the first batch is received based at least in part on a total number of de-duplicated RFID reads by the other RFID de-duplication procedure reaching a threshold number.

4. The system of claim 1, wherein the first RFID read is based at least in part on an RF emission from the RFID scanning device and a first RF response of an RFID tag attached to the same item, wherein the RFID tag is configured to forgo a second RF response within a time duration from the first RF response based at least in part on a type of an RFID read session.

5. A computer-implemented method comprising:

receiving, from an RFID scanning device, first data corresponding to first radio frequency identification (RFID) reads by the RFID scanning device, the first data comprising a first RFID read identifying an item and a second RFID read identifying the item, the RFID scanning device configured to generate the first RFID read upon a scan of an RFID tag and to suppress a radio frequency (RF) response from the RFID tag until expiration of a timer started after the first RFID read is generated;

determining, based at least in part on a comparison of a first data portion of the first data corresponding to the first RFID read and a second data portion of the first data corresponding to the second RFID read, that the first data portion and the second data portion indicate that the item is detected to be within a location;

generating second data by at least removing the second data portion from the first data, the second data indicating the first RFID read but not the second RFID read, wherein the second data is smaller in size than the first data such that processing of queries to a data store for an RFID read de-duplication procedure is reduced by at least using the second data instead of the first data;

as part of the RFID read de-duplication procedure:

determining, based at least in part on the location, an RFID read removal rule applicable to remove duplicate RFID reads, the RFID read removal rule indicating a time window, and determining, based at least in part on a query to the data store storing previously stored data corresponding previous RFID reads that are associated with the location and that are generated within the time window, that (i) a no match exists between the first data portion corresponding to the first RFID read and the previously stored data, (ii) a match exists between a third data portion of the second data corresponding to a third RFID read and the previously stored data;

generating a count of items detected within the location by at least incrementing a previous count based at least in part on the no match existing between the first data portion and previously stored data and by at least foregoing a count increment based at least in part on the match existing between the third data portion and the previously stored data; and sending the count to a computer system for presentation by the computer system such that to enable a more accurate track of the items within the location.

6. The computer-implemented method of claim 5, wherein:

receiving the first data comprising receiving a first batch of RFID reads from the RFID scanning device, the first batch associated with the location within an item storage facility.

7. The computer-implemented method of claim 5, further comprising:

determining, based at least in part on a type of the location, a set of rules applicable to remove duplicate data portions from the second data and comprising the RFID read removal rule; and performing a de-duplication procedure based at least in part on the set of rules, wherein the de-duplication procedure comprises determining matches between the second data and the previously stored data.

8. The computer-implemented method of claim 7, further comprising:

determining, based at least in part on the set of rules, the time window, wherein the previously stored data corresponds to data portions indicating that second items were detected within the location during the time window;

determining that the first data portion has no duplicate correspondence in the previously stored data; and determining that the third data portion has a duplicate correspondence in the previously stored data.

9. The computer-implemented method of claim 7, further comprising:

determining that the first data is associated with a session identifier;

determining, based at least in part on the set of rules, the time window, wherein the previously stored data is associated with first session identifier and corresponds to data portions indicating that second items were detected within the location during the time window;

determining that the first data portion has no duplicate correspondence in the previously stored data; and determining that the third data portion has a duplicate correspondence in the previously stored data, wherein the duplicate correspondence is associated with the session identifier.

10. The computer-implemented method of claim 7, further comprising:

determining that the first data is associated with a first session identifier;

determining, based at least in part on the set of rules, the time window, wherein the previously stored data is associated corresponds to data portions indicating that second items were detected within the location during the time window; and determining that the first data portion and a first previously stored data portion identify the item, wherein the no match between the first data portion and the previously stored data is determined based at least in part on a determination that the first data portion is associated with the first session identifier and that the first previously stored data portion is associated with a second session identifier.

11. The computer-implemented method of claim 5, further comprising:

determining that the third data portion matches a previously stored data portion based at least in part on the third data portion and the previously stored data portion identifying a same second item;

determining that a first timestamp of the third data portion is more recent than a second timestamp of the previously stored data portion;

determining that a time difference between the first timestamp and the second timestamp is within a threshold time difference; and determining that the count increment is to be foregone and that the previously stored data portion is to be replaced with the third data portion based at least in part on the time difference being within the threshold time difference.

12. The computer-implemented method of claim 5, further comprising:

determining that the third data portion matches a previously stored data portion based at least in part on the third data portion and the previously stored data portion identifying a same second item;

determining that a time difference between a first timestamp of the third data portion and a second timestamp of the previously stored data portion is within a threshold time difference;

determining that the third data portion is associated with the location and that the previously stored data portion is associated with a different location;

determining that the previously stored data portion is associated with a higher signal strength relative to the third data portion; and determining that the count increment is to be foregone based at least in part on the previously stored data portion being associated with the higher signal strength.

13. The computer-implemented method of claim 5, further comprising:

determining that a fourth data portion of the second data matches a previously stored data portion based at least in part on the fourth data portion and the previously stored data portion identifying a same second item;

determining that the fourth data portion is associated with the location and that the previously stored data portion is associated with a different location;

determining that the previously stored data portion is associated with a lower signal strength relative to the third data portion; and determining that the previous count is to be incremented for the location and that a different count for the different location is to be decremented based at least in part on the previously stored data portion being associated with the lower signal strength.

14. One or more non-transitory computer-readable storage media storing instructions, that upon execution on one or more processors, cause the one or more processors to perform operations comprising:

receiving, from an RFID scanning device, first data corresponding to first radio frequency identification (RFID) reads by the RFID scanning device, the first data comprising a first RFID read identifying an item and a second RFID read identifying the item, the RFID scanning device configured to generate the first RFID read upon a scan of an RFID tag and to suppress a radio frequency (RF) response from the RFID tag until expiration of a timer started after the first RFID read is generated;

determining, based at least in part on a comparison of a first data portion of the first data corresponding to the first RFID read and a second data portion of the first data corresponding to the second RFID read, that the first data portion and the second data portion indicate that the item is detected to be within a location;

generating second data by at least removing the second data portion from the first data, the second data indicating the first RFID read but not the second RFID read, wherein the second data is smaller in size than the first data such that processing of queries to a data store for an RFID read de-duplication procedure is reduced by at least using the second data instead of the first data;

as part of the RFID read de-duplication procedure:

determining, based at least in part on the location, an RFID read removal rule applicable to remove duplicate RFID reads, the RFID read removal rule indicating a time window; and determining, based at least in part on a query to a data store storing previously stored data corresponding previous RFID reads that are associated with the location and that are generated within the time window, that (i) a no match exists between the first data portion corresponding to the first RFID read and the previously stored data, (ii) a match exists between a third data portion of the second data corresponding to a third RFID read and the previously stored data;

generating a count of items detected within the location by at least incrementing a previous count based at least in part on the no match existing between the first data portion and previously stored data and by at least foregoing a count increment based at least in part on the match existing between the third data portion and the previously stored data; and sending the count to a computer system for presentation by the computer system such that to enable a more accurate track of the items within the location.

15. The one or more non-transitory computer-readable storage media of claim 14, wherein the operations further comprise:

determining the location based at least in part on the first data, wherein the first data includes location data indicating the location;

determining, based at least in part on a type of the location, a set of rules applicable to remove duplicate data portions from the second data, the set of rule comprises the RFID read removal rule; and performing a de-duplication procedure based at least in part on the set of rules, wherein the de-duplication procedure comprises determining matches between the second data and the previously stored data.

16. The one or more non-transitory computer-readable storage media of claim 15, wherein the operations further comprise:

determining a session identifier based at least in part on the first data, wherein the first data includes session data indicating the session identifier and is received from the RFID scanning device that is associated with the session identifier, and wherein the de-duplication procedure is performed further based at least in part on the session identifier.

17. The one or more non-transitory computer-readable storage media of claim 14, wherein the operations further comprise:

determining that the third data portion matches a previously stored data portion based at least in part on the third data portion and the previously stored data portion identifying a same second item;

determining that the third data portion is associated with a signal strength;

determining that the signal strength is lower than a threshold signal strength; and removing the third data portion from the second data based at least in part on the signal strength being lower than the threshold signal strength.

18. The one or more non-transitory computer-readable storage media of claim 14, wherein receiving the first data comprises receiving metadata indicating a detection of first items, wherein the metadata comprises a storage facility identifier, a location identifier, a session identifier, and the first data portion, and wherein the first data portion comprises an item identifier, a timestamp, and a signal strength.

19. The one or more non-transitory computer-readable storage media of claim 18, wherein the operations further comprise:

storing, in the data store, the storage facility identifier, the location identifier, the session identifier, and the first data portion but not the third data portion, wherein the count is generated based at least in part on a set of data stored in the data store.

20. The one or more non-transitory computer-readable storage media of claim 14, wherein the operations further comprise:

receiving, from the RFID scanning device, an indication of the location;

determining previously stored data portions identifying a second set of items, wherein the second set is previously detected within the location; and sending the previously stored data portions to the RFID scanning device, wherein the first data comprises data portions identifying a first set of items that is different from the second set.

\* \* \* \* \*